United States Patent [19]
Steigerwald et al.

[11] Patent Number: 4,912,622
[45] Date of Patent: Mar. 27, 1990

[54] GATE DRIVER FOR A FULL-BRIDGE LOSSLESS SWITCHING DEVICE

[75] Inventors: Robert L. Steigerwald, Burnt Hills; Khai D. T. Ngo, Schenectady, both of N.Y.

[73] Assignee: General Electric Company, Schenectady, N.Y.

[21] Appl. No.: 164,600

[22] Filed: Mar. 7, 1988

[51] Int. Cl.⁴ ............................................. H02M 7/44
[52] U.S. Cl. ...................................... 363/98; 363/17; 363/132
[58] Field of Search ............... 363/17, 56, 98, 132, 363/16; 307/254, 300, 571

[56] References Cited

U.S. PATENT DOCUMENTS

| | | | |
|---|---|---|---|
| 3,976,932 | 8/1976 | Collins | 363/132 |
| 4,027,228 | 5/1977 | Collins | 363/132 |
| 4,413,313 | 11/1983 | Robinson | 363/16 |
| 4,502,085 | 2/1985 | Morrison et al. | 363/132 |
| 4,504,895 | 3/1985 | Steigerwald | 363/17 |
| 4,533,986 | 8/1985 | Jones | 363/17 |
| 4,541,041 | 9/1985 | Park et al. | 363/41 |
| 4,546,422 | 10/1985 | Okado | 363/98 |
| 4,566,059 | 1/1986 | Gallios et al. | 363/98 |
| 4,628,426 | 12/1986 | Steigerwald | 363/17 |
| 4,639,849 | 1/1987 | Noworolski et al. | 363/56 |
| 4,672,528 | 6/1987 | Park et al. | 363/98 |
| 4,691,270 | 9/1987 | Pruitt | 363/56 |
| 4,694,384 | 9/1987 | Steigerwald et al. | 363/17 |
| 4,700,285 | 10/1987 | Szepesi | 363/131 |
| 4,709,316 | 11/1987 | Ngo et al. | 363/21 |
| 4,727,272 | 2/1988 | Foch et al. | 307/571 |
| 4,730,242 | 3/1988 | Divan | 363/132 |
| 4,757,432 | 7/1988 | Hancock | 363/17 |
| 4,788,634 | 11/1988 | Schlecht et al. | 363/131 |

OTHER PUBLICATIONS

Liu et al., "Zero Voltage Switching Technique In DC/DC Converters"; pp. 58–70.
R. L. Steigerwald, "High Frequency Resonant Transistor DC-DC Converters," IEEE Trans. Ind. Electron, IE-31, pp. 181–191, May 1984.

Primary Examiner—Patrick R. Salce
Assistant Examiner—Jeffrey Sterrett
Attorney, Agent, or Firm—Jill M. Breedlove; James C. Davis, Jr.; Marvin Snyder

[57] ABSTRACT

A control circuit for a full bridge switching converter including power FET switching devices. The control circuit including a gate driver with a voltage sensor circuit which senses the precise instant to gate the power FET on in order to achieve substantially lossless switching by the converter.

8 Claims, 5 Drawing Sheets

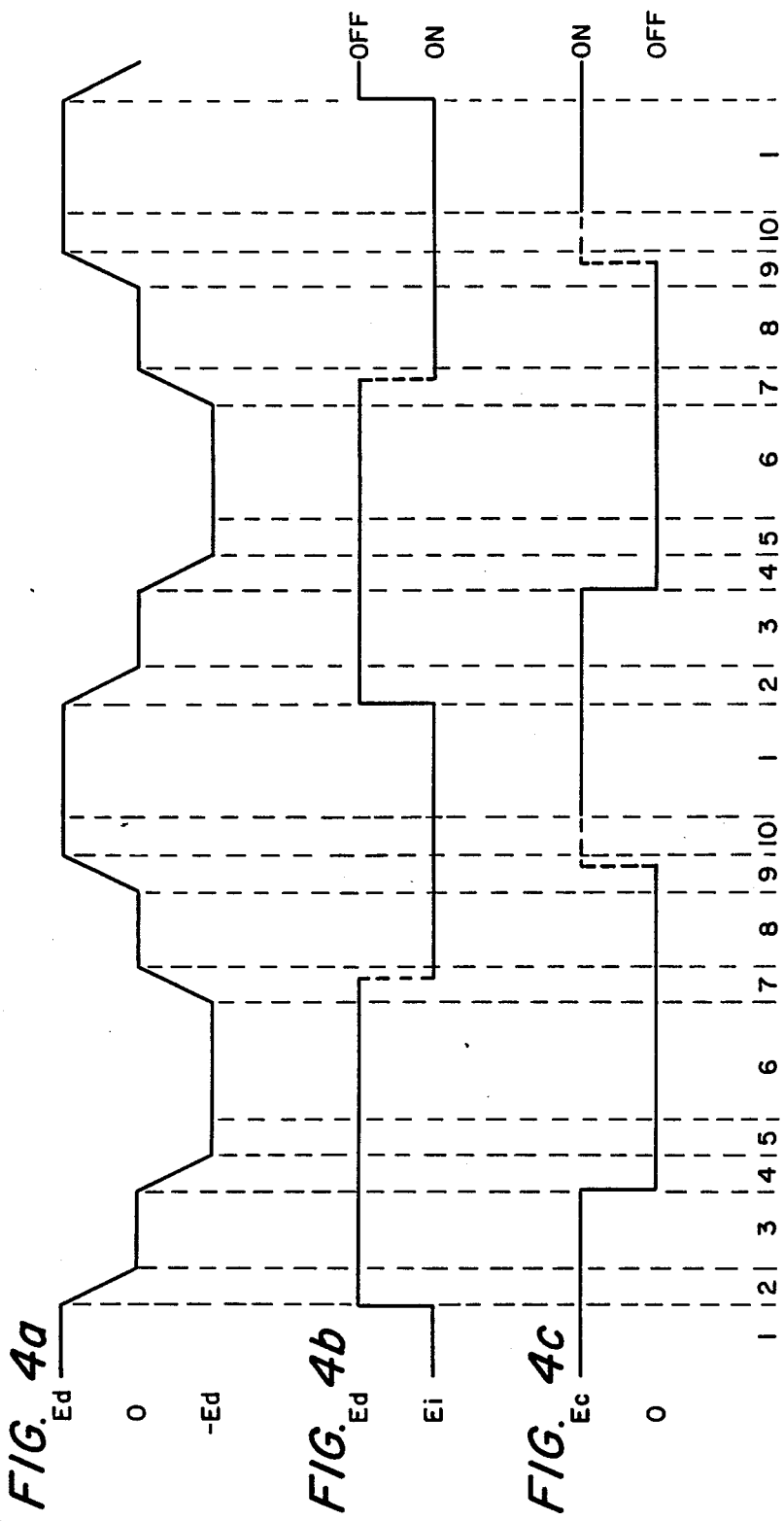

GATE DRIVER FOR A FULL-BRIDGE LOSSLESS SWITCHING DEVICE

RELATED APPLICATIONS

This application is related to concurrently filed co-pending U.S. application Ser. No. 164,603, filed Mar. 7, 1988 entitled "Full-Bridge Lossless Switching Converter", which is assigned to the instant assignee and specifically incorporated by reference.

The present invention relates in general to control circuits for dc-to-dc converters and more specifically to a control circuit including gate driver with a voltage sensing circuit which senses the precise instant to gate the power FETS of the converter on in order to maintain substantially lossless switching.

BACKGROUND OF THE INVENTION

Many types of dc-to-dc converters are known in the art for converting a first dc voltage to a second, regulated dc voltage. Typically, the dc input voltage is converted to an ac voltage (or dc pulses) by a switching transistor or transistors. The ac voltage is then converted to a regulated dc output voltage. Feedback of the output voltage may be used to control the duty cycle or the frequency of the ac voltage to achieve the desired voltage regulation.

Switching converters are known to have a higher efficiency than other types of dc power supplies, such as series-regulated power supplies. However, the efficiency of switching converters is limited by losses in the switching transistor(s) during turn-on and turn-off, particularly in pulse-width modulated (PWM) converters. In addition, the switching transistor(s) must simultaneously withstand high current and high voltage during both turn-on and turn-off.

Class E, Quasi-Resonant, and Bridge type resonant converters have all been used to achieve high frequency lossless switching. These circuits use high frequency inductors and capacitors to resonate the current or voltage across a device to zero in order to achieve low loss switching. These passive components cannot be integrated and therefore are not desirable for a very high density system.

Resonant converters use a variable frequency ac voltage for regulating the dc output voltage. Commonly assigned U.S. Pat. No. 4,672,528 of Park et al., which is incorporated herein by reference, describes such a resonant converter and provides a detailed background of the advantages and disadvantages of resonant converters. In resonant converters, it is possible to have either lossless turn-on or lossless turn-off, but not both. Furthermore, current in the transistor(s) of a resonant converter is relatively high. Because of these large currents, such resonant converters require costly transistors with high current ratings. Therefore, one of the primary goals of converter design is to reduce the transistor losses which degrade circuit efficiency and increase the cost of the converter.

Another goal of converter design is to reduce the size and weight. One proposed method of reducing the size and weight of the converter, while beneficially increasing the response time, is to increase the converter switching frequency. By increasing the switching frequency, a converter having smaller size, low weight, and faster response times can be obtained. The size and weight are decreased because the passive components required for operation at high frequency are smaller. However, the higher frequency switching aggravates transistor losses and degrades efficiency.

Normally, the switching devices utilized in switching power supplies are bipolar transistors, thyristors or field effect transistors. Although these devices may be modeled as ideal switches, it is well known that a more accurate model includes the parasitic effects of the device geometry. These parasitic components include diodes, capacitors and inductors whose effect on circuit operation may be minimized or ignored by proper design of the switching devices. Conversely, again by proper device selection or design, certain parasitic effects may be enhanced and beneficially employed in the operation of the circuit. Physical transformers also include nonideal parasitic elements which may be beneficially employed by proper design of the transformer and the switching circuit.

In order to reduce the expense, size and weight of conventional switching converters, it would be advantageous to design a switching converter which could utilize the parasitic characteristics of the switching devices and the isolation transformer of the switching circuit. Utilizing the parasitic characteristics of the switching devices and the transformer, it is possible to eliminate many of the discrete components of a switching converter which contribute substantially to its size, weight and cost.

SUMMARY OF THE INVENTION

A full bridge is operated in such a manner that substantially lossless switching of the semiconductor switching devices results. A voltage sensing circuit is included as part of the switching device gate driver. The voltage sensing circuit senses the precise instant to gate the power FET on in order to maintain lossless switching.

The control circuit of the present invention is adapted to drive the gate of one of the FET power switching devices in a converter bridge. Each of the switching devices in the bridge will have its own, separate, control circuit. The control circuit consists of a first switch responsive to external logic signals to turn on the switching device in response to a signal from the external logic. The first switch activates a series of FET devices which turn on the power switching device. A second switch, also responsive to external logic signals turns the power switching device off in response to a signal from the external logic. The control circuit also includes a voltage sensing circuit which is adapted to sense the voltage across the switching device and turn the switching device on when the voltage across the switching device reaches a predetermined level.

It is therefore an object of the present invention to provide a control circuit for a voltage converter which turns on each of the power switching elements when the voltage across that switching element reaches a predetermined value in order to provide substantially lossless switching.

It is a further object of the present invention to provide control circuits for a voltage converter which include a voltage sensing circuit which senses the voltage across a power switching element and causes the control circuit to switch the power switching element on when the voltage across that element reaches a predetermined value.

BRIEF DESCRIPTION OF THE DRAWINGS

The novel features of the invention are set forth with particularity in the appended claims. The invention itself, however, both as to organization and method of operation, together with further objects and advantages thereof, may best be understood by reference to the following description taken in conjunction with the accompanying drawings in which:

FIG. 4a illustrates the transformer drive voltage of the circuit of FIG. 1.

FIG. 4b illustrates the gate drive voltage as a function of time for one of the switching devices in FIG. 1.

FIG. 4c illustrates the gate drive voltage as a function of time for a second of the switching devices illustrated in FIG. 4b.

DETAILED DESCRIPTION OF THE INVENTION

Figure 1:
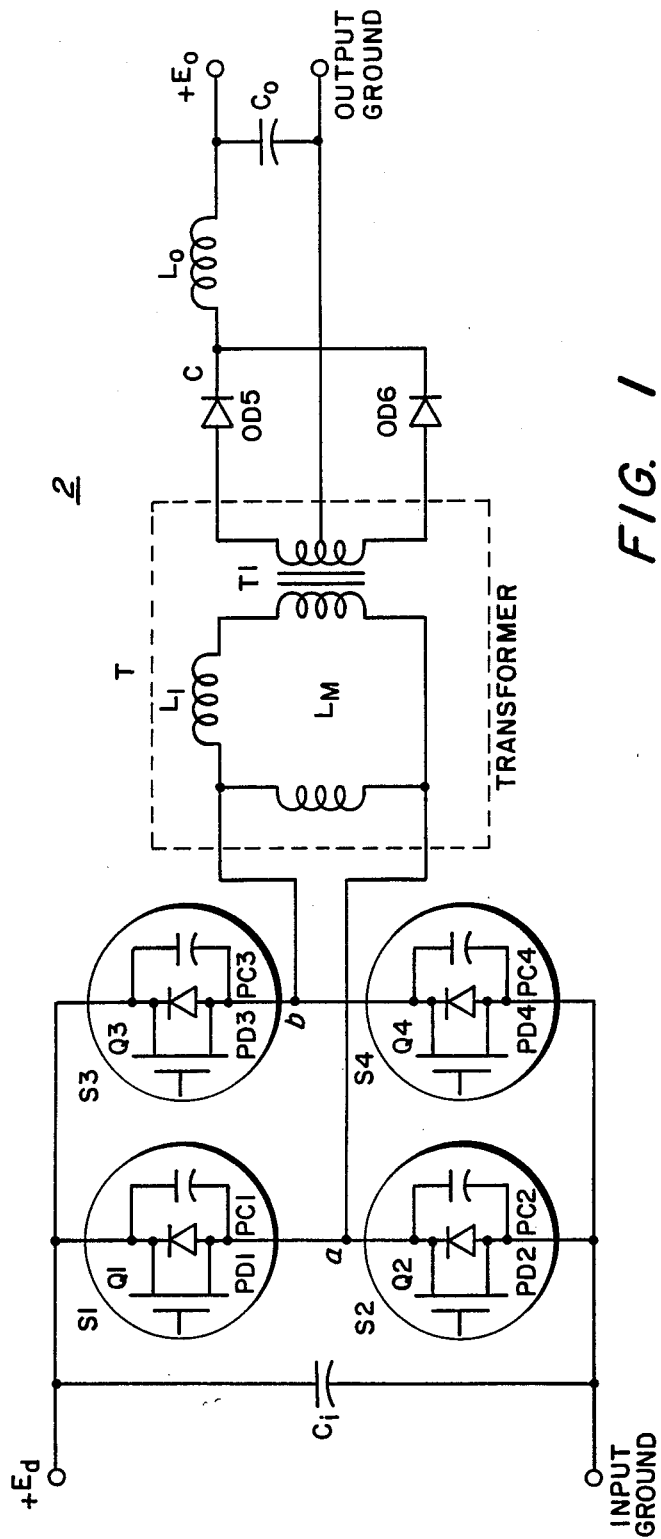
FIG. 1 is a schematic diagram of a power circuit for a lossless switching full-bridge converter according to the present invention.

FIG. 1 illustrates a lossless switching full-bridge converter 2 in which the input is driven by dc source voltage $E_d$. Recently, converters of the type shown in FIG. 1 have been referred to as "edge resonant" or "transition resonant" converters. Input capacitor $C_i$ smooths input voltage $E_d$ and stores energy returned to the source from the components of the full bridge. In FIG. 1, high voltage switching devices S1, S2, S3 and S4 (FET transistors) form a bridge at the converter input. The series combination of switching devices 51 and S2 is connected in parallel across capacitors $C_i$ and the series combination of switching devices S3 and S4.

In FIG. 1, parasitic capacitance PC1 and parasitic diode PD1 are connected across the drain and source leads of ideal FET switch Q1. Q1 is an ideal FET while PD1 is its inverse parallel parasitic diode and PC1 is its parasitic output capacitance (the sum of the drain-gate and drain-source capacitances). Parasitic capacitors PC2-PC4 and parasitic diodes PD2-PD4 are likewise connected across the source and drain electrodes of ideal FET switches Q2-Q4. These parasitic capacitors and diodes represent actual parasitic devices which result from the geometry of the switching device.

The node connection between S1 and S2 is labeled a. The other end of the T transformer primary is labeled b and is located at the node between switching devices S3 and S4.

Transformer T consists of ideal transformer T1, leakage inductance $L_1$ and magnetizing inductance $L_M$. The output of transformer T is connected through a rectifying bridge consisting of diodes OD5 and OD6 to a low pass filter consisting of inductor $L_o$ and capacitor $C_o$. The output voltage is labeled $E_o$ (typically 5 volts).

The topology illustrated in FIG. 1 uses a minimum number of passive components. Only an input high-frequency bypass capacitor $C_i$, an isolation transformer T, and an output filter $L_o$, $C_o$ are necessary. In addition, the four switching devices S1-S4 in FIG. 1 have ratings (especially voltage ratings) considerably below the ratings required of transistors employed in other high-frequency switching converters. Therefore, the circuit of FIG. 1 is more amenable to integration which is desirable in order to achieve high power density. In addition, the topology of FIG. 1 results in very low switching losses. Finally, the output voltage may be controlled by phase-shifting of the two half-bridge legs (i.e., the voltage at nodes a and b) to control the output voltage $E_o$.

Figure 2:
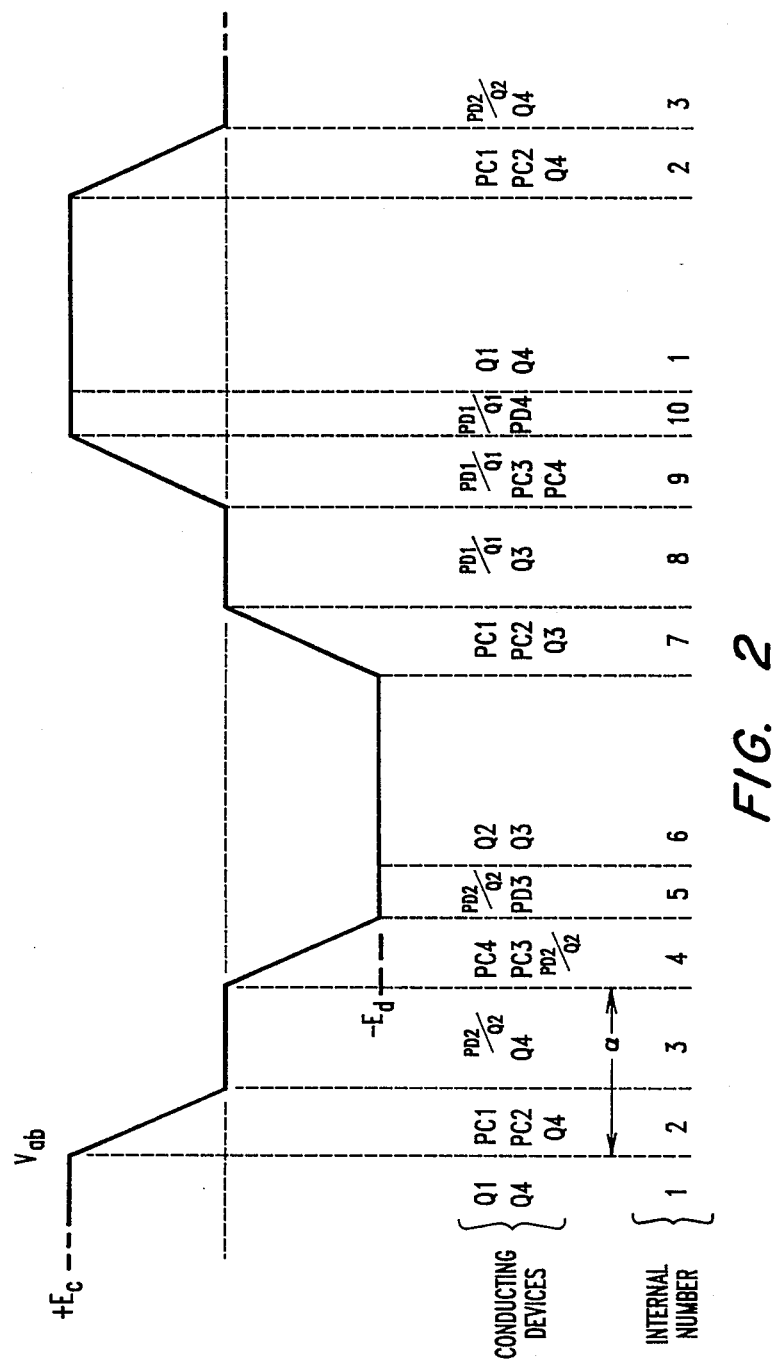
FIG. 2 illustrates the transformer drive voltage of the circuit illustrated in FIG. 1.

FIG. 2 illustrates the voltage waveform applied to high-frequency transformer T (i.e., the voltage between points a and b) during normal operation. Below the waveform in FIG. 2 is listed the conducting devices during each interval of operation over a complete cycle. For example, Q1 and Q4 both conduct during interval 1. Interval 1 ends when Q1 stops conducting. During interval 2, capacitors PC1, PC2 and switching device Q4 conduct. The actual operaton of the circuit of FIG. 1 may now be described in greater detail with reference to the waveform of FIG. 2.

Referring to the waveform of FIG. 2, operation of the circuit in FIG. 1 is as follows. The description of operation begins in interval 1 when Q1 and Q4 are gated on and are conducting, thus supplying the full dc input voltage, $E_d$, to the transformer (the voltage drops of the power FETS and diodes will be neglected to simplify this discussion). Thus, during interval 1, point a is at $E_d$ and point b is at zero volts. The voltage at point c (and thus the output voltage $E_o$) is a function of the transformer turns ratio. Note that, during interval 1, the output capacitances of both Q2 and Q3 are charged to the full dc value of $E_d$. Also during interval 1, current is built up linearly in the transformer magnetizing $L_M$ and leakage $L_1$ inductances. This energy will serve a purpose which will be evident shortly.

At the end of interval 1, Q1 rapidly turns off (Q4 continues to conduct), and the current that was in Q1 is maintained by the transformer $L_M$ and $L_1$ inductances. Thus, current is maintained in transformer T after Q1 is turned off at the end of interval 1. During interval 2, the inductive current which is now in PC1 and PC2 drives node a toward ground. Note that the energy that was initially in PC2 is not lost, but rather discharged to the dc supply. When node a reaches ground, the inverse parallel diode of Q2 (PD2) comes into conduction (assuming an ideal diode characteristic) which marks the beginning of interval 3. Once PD2 is conducting, Q2 will be gated on when the voltage across Q2 is approximately zero. During interval 3, the voltage between points a and b is zero as current, which is maintained by $L_M$ and $L_1$, circulates through Q4 and PD2. The voltage at point c on the secondary side of the transformer is also near zero, however, output inductor $L_o$, maintains current at the output such that the voltage across the output load remains substantially constant. Interval 3 continues until Q4 turns off.

Note that the interval 2 plus interval 3 time, alpha, is controllable and may be used to regulate the output voltage. Control of this interval is accomplished by means of switching device Q4 which may be turned off at anytime during interval 2 or 3. When Q4 is turned off, PC3, PC4 and PD2 conduct. The RMS voltage of the transformer drive is increased as the duration of intervals 4 to 7 increases in FIG. 2.

At the end of interval 3, Q4 turns off, however, its current is maintained by $L_M$ and $L_1$. At the same instant, PC4 begins to conduct the current which would have flowed through transistor Q4. Thus, during interval 4, the current flowing into point b, drives the voltage at point b toward the dc bus, $E_d$. As the charge builds up on PC4, the voltage at node b increases, decreasing the voltage across capacitor PC3. Once capacitor PC3 is sufficiently discharged by the current flowing into node b, diode PD3 turns on. The energy stored in PC3 is not lost during this process, it is discharged back to the dc supply. Once PD3 is conducting, Q3 will be gated on when the voltage across Q3 is approximately zero.

During interval 5, the current in the leakage inductance reverses rapidly as PD3 begins to conduct since the full dc voltage is applied to the leakage inductance $L_1$. The current in the larger magnetizing inductance $L_M$ also begins to reverse (the current in the magnetizing inductance is approximately a triangular wave over a complete cycle). Sometime during interval 5 (before the current in PD2 and PD3 reach zero), Q3 turns on (Q2 is already conducting).

Once Q2 and Q3 turn on and the current has reversed in inductors $L_1$ and $L_M$, the transformer voltage is reversed. Therefore, the inductive current in $L_1$ and $L_M$ flows from node b, through the transformer primary and into node a during interval 6. Interval 6 is maintained at least long enough to ensure that the current in $L_1$ and $L_M$ is sufficient to insure conduction during intervals 7-10.

During intervals 5 and 6 the full dc input voltage, $E_d$, is once again applied to transformer T. However, since the input voltage is applied to node b, the transformer voltage is reversed as compared to interval 1. The half cycle defined by intervals 6-10 repeat the sequence described above with switching devices Q2 and Q3 as the active switching elements. At the end of interval 10 the next cycle begins with interval 1. Again, output voltage $E_o$ may be regulated by adjusting the time alpha, which amounts to phase shifting the two half-bridge converter legs relative to one another.

One of the significant aspects of designing the circuit of FIG. 1 is the necessity of selecting a transformer with the proper characteristics. The optimum selection of $L_M$ and $L_1$ depends on the application. Some magnetizing inductance $L_M$ is necessary to provide current to charge and discharge capacitors PC1-PC4 during no load (i.e., where the current in $L_1$ is zero due to a no load condition at the converter output). However, there is an incentive to keep the peak current in $L_M$ as low as possible, since the current rating of the FETS used for switching devices Q1-Q4 must be sufficient to carry the full load primary current and the current in $L_M$. In addition, increasing $L_M$ increases the time required to reverse the transformer current (e.g., during interval 5 of FIG. 2) which lowers the operating frequency of the converter. At full load, the current in $L_M$ may be very small since leakage inductance $L_1$ can provide inductive energy for charging and discharging the device capacitances.

To meet these conflicting requirements, $L_1$ could be minimized, and $L_M$ could be designed to provide the inductive energy needed to achieve the charging and discharging of the device capacitances during both full and no load conditions. In this case, however, the peak current in $L_M$ would have to be greater than the full load current (reflected to the primary side) in order to overcome the tendency of the current in $L_M$ to circulate through the primary of ideal transformer T1 when the transformer secondary is effectively shorted (e.g., during interval 3).

A finite $L_M$ may be obtained by using a Nickel-Zinc Ferrite material for the transformer core. Nickel-Zinc has a relatively low permeability which results in a non-negligible magnetizing inductance, $L_M$. In addition, "Nickel-Zinc" is suited to operation above 1 MHz where the conventional power Ferrites (Manganese-Zinc) have excessive core losses. "Nickel-Zinc" thus provides a high frequency transformer core with a predictable, non-negligible magnetizing inductance. This material may, therefore, be used advantageously to construct transformer T.

Leakage inductance $L_1$ is inevitable in transformer design. However, leakage inductance is primarily a function of the transformer structure and the coupling between the transformer primary and secondary. Therefore, it is to a great extent controllable. By properly designing transformer T of FIG. 1, it is possible to obtain a leakage inductance which will work with the magnetizing inductance. In summary, transformer T of FIG. 1 is practical and realizable.

Because control of the converter is by relative phase shift of the two converter half-bridge legs, instantaneous switching of the converter legs in response to a sensed parameter is not required. That is, since the output voltage is a function of the relative phase shift between the two inverter legs, the absolute values of delays in logic circuitry from a master oscillator to the gate drivers is not critical: It is the relative timing of the gate drive signals which is of importance, since it is the relative timing which determines the phase relationship between the currents in the half-bridge legs. Phase shifting the converter half-bridge legs relative to one another even provides a means of reducing the output voltage to zero. Further, since it is possible to shift the phases almost instantaneously, this capability provides protection from output shorts. Absolute zero output voltage is attained by switching such that the voltage on the two converter legs are exactly in phase (i.e., the voltage at points a and b in FIG. 1 would rise and fall together) thus providing an effective current limit. The rate of output current rise when a short is encountered is limited by the output filter inductor, $L_o$.

In order to maintain lossless switching action, precise timing of the turn-on gating signal is needed. For example, referring to FIG. 2, at the end of interval 4 diodes PD2 and PD3 are both conducting. FET Q2 can be gated on during interval 3 or 4. During interval 5, switching device Q3, which is in inverse parallel with diodes PD3, is gated on so that, as the load current reverses, switching devices Q2 (which was gated during interval 4) and Q3 are ready to carry the current. Note, however, that Q3 cannot be gated on too early (for example during interval 4) because this would result in the FET output capacitances being discharged through the switching devices with a resulting loss of energy. Thus, switching device Q3 must be gated on at precisely the right moment during the interval 5. Note that the time when interval 5 begins is not predictable since the length of interval 4 is a function of the current.

Figure 3A:
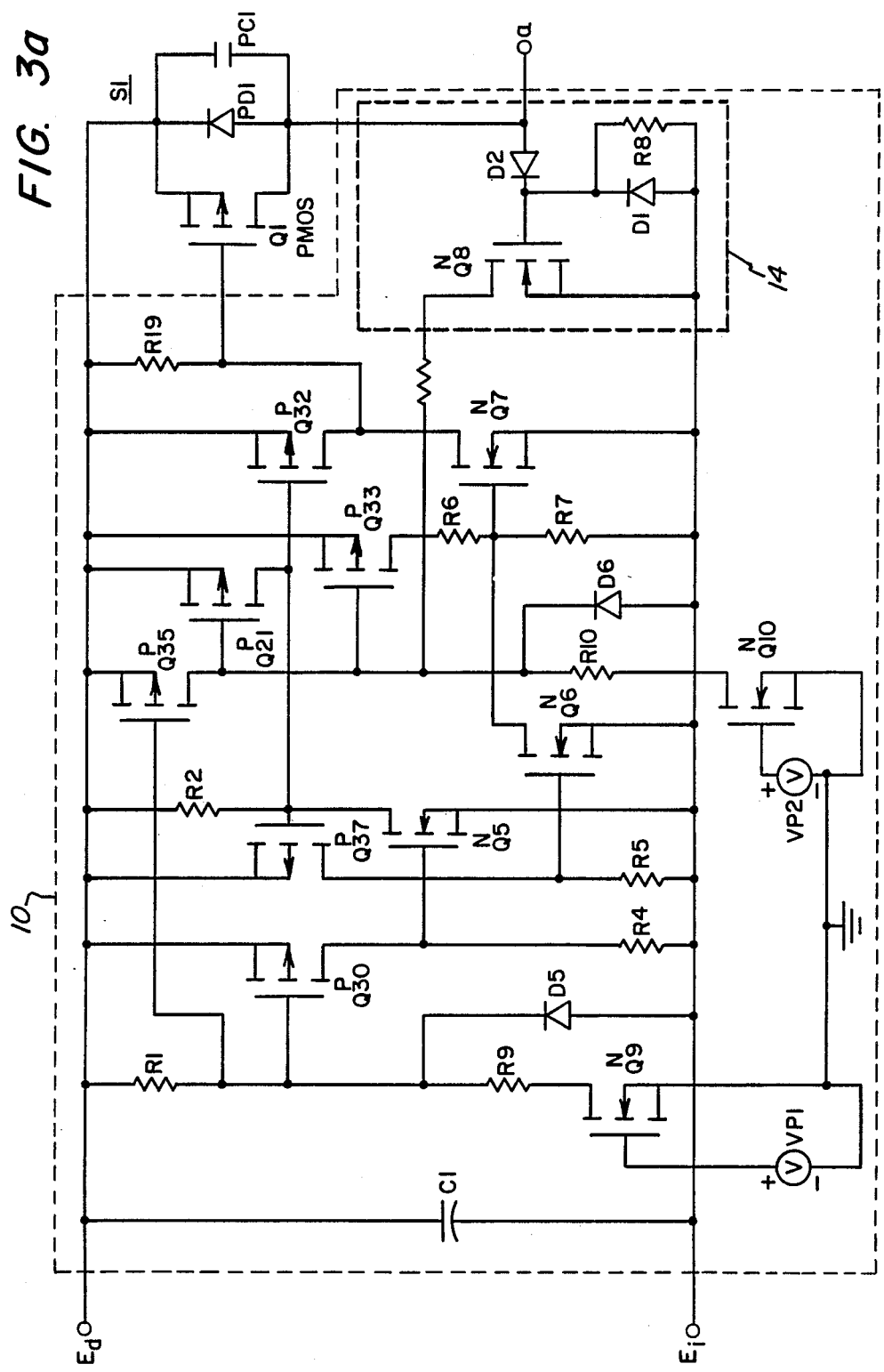
FIG. 3 is a schematic diagram of one embodiment of the gate drive circuits for two of the switching devices illustrated in FIG. 1.
Figure 3B:
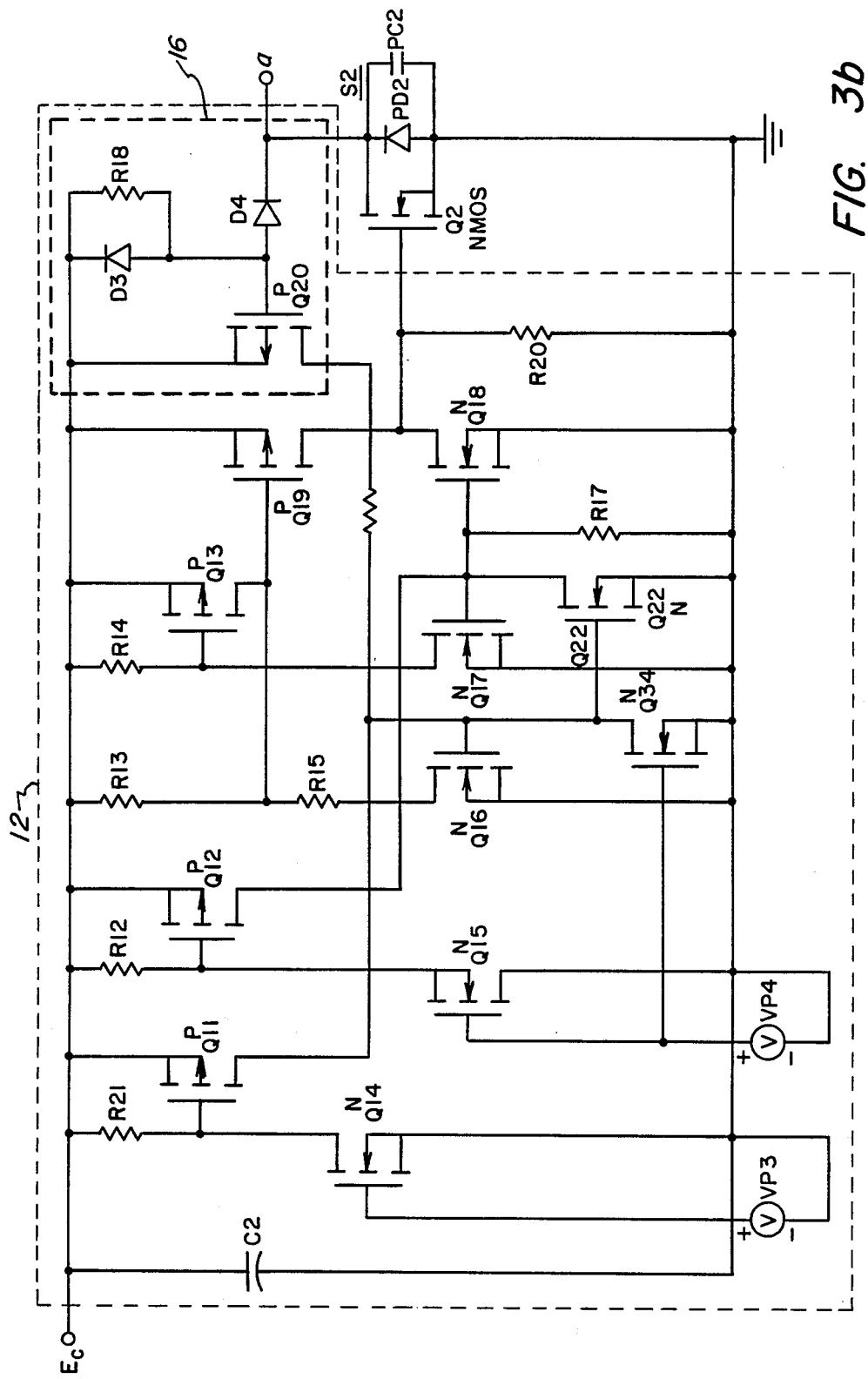

FIG. 3 illustrates one embodiment of two of the four gate drivers necessary to drive switching devices Q1-Q2 of FIG. 1. Upper gate driver 10 and lower gate driver 12 drive switching devices Q1 and Q2 respectively. Substantially identical gate drivers could be used to drive switching devices Q3 and Q4. All of the transistors illustrated in FIG. 3 are enhancement mode, insulated gate field effect transistors.

In FIG. 3, upper gate driver 10 is adapted to control transistor Q1 during both start-up and steady state operation. During start-up, the currents in inductors $L_1$ and $L_M$ have not yet been established. Therefore, the voltage at node a remains constant until either Q1 or Q2 are activated. Therefore, voltage VP2 is provided to initiate interval 1. VP2 is normally off; when it turns on, Q10 turns on which activates Q33 and turns Q1 on through Q7. Q10 also activates Q21 which raises the voltage at the gate of Q32, which removes the turn-off gate drive of Q1. At the end of interval 1, Q1 may be turned off by means of a voltage VP1. When VP1 is activated, Q9 turns on which turns on Q37 and Q32 through Q30 and Q5. Q32 shorts the gate of Q1 to $E_d$, turning it off, while Q37 ensures that Q7 remains off by turning on Q6 which removes the turn on drive provided by Q7. Finally, Q9 also turns on Q35 which prevents Q21 from turning Q32 off, ensuring that Q1 will be turned off. As will be apparent to those skilled in the art, gate driver 12 acts in a substantially identical manner to control the operation of Q2.

As was previously mentioned, it is extremely difficult to predict the exact time at which transistors Q1–Q4 should be turned on to avoid losses resulting from the premature discharge of capacitors PC1–PC4. Therefore, gate drivers 10 and 12 include voltage sensors 14 and 16 which are designed to turn transistors Q1 and Q2 on at precisely the instant necessary to ensure substantially lossless switching.

Gate drive circuits 10 and 12 sense when the voltage across the respective switching devices Q1 and Q2 approach zero and gate the switching device on when this happens so that it is ready to carry the primary current as it reverses. In FIG. 3, switching device Q1 is a p-channel power device switching device Q2 is an n-channel power device. This configuration is used in the embodiment of FIG. 3 because it facilitates integration of the gate drivers and switching devices on a single chip, while minimizing the capacitive substrate currents which result from the high rates of change of voltage at point a.

The keys to improved gate drivers 10 and 12 are voltage sensors 14 and 16, respectively, which are shown inside the heavy dotted lines in FIG. 3. Voltage sensor 14 senses the voltage across switching device Q1. (Voltage sensor 16 senses the voltage across switching device Q2.) During operation of the switching converter, the voltage of node a is a function of the magnetizing and leakage inductance currents as explained previously. Consider voltage sensor 14, when switching device Q2 turns off, the voltage at node a rises due to the inductive load charging PC2 and discharging PC1 as discussed above. When the voltage at node a exceeds the voltage $E_i$ at the negative terminal of gate driver 10, the sense FET Q8 turns on through diode D2, which turns on Q1 through Q33 and Q7. Thus Q1 is ready to conduct when the load current reverses.

In this manner the power FETs are gated on only when there is near zero voltage across them, thus insuring that the energy stored in the FET output capacitances is not "dumped" (and therefore lost) in the FET channels. Note that no control is needed to turn the FETs on; this is automatically done by the sense circuit (a similar circuit 16 is shown for Q2). The control need only command a device to turn off. Thus, proper timing is assured to maintain lossless switching.

A signal to command the FETs to turn on is given by the control logic at a time known to be later than needed for proper circuit operation (that is, the FET voltage sensing devices will normally turn the power FETs on). These control turn-on commands are intended to get the circuit started because load current will not be available at start-up to insure that the load voltage node, $V_{LOAD}$, swings between the dc voltage rails. In addition, these logic circuits ensure proper operation of the circuit where the inductive currents are not sufficient to ensure proper operation of sense circuits 14 and 16. Diodes D2 and D1 protect the gate of Q8 from excessive reverse voltage when Q2 is conducting.

FIG. 4 illustrates the waveforms associated with the gate drivers of FIG. 3, including voltage sense circuits 14 and 16. FIG. 4(a) illustrates the output voltage between points a and b of FIG. 1. FIG. 4(b) illustrates the drive voltage at the gate of transistor Q1. FIG. 4(c) illustrates the drive voltage at the gate of transistor Q4.

Since Q1 is a P-channel metal oxide semiconductor PMOS transistor (see FIG. 3), it turns on as its gate drive voltage approaches $E_i$ and turns off as its gate drive voltage approaches $E_d$. $E_i$ is an intermediate voltage which is normally 15 volts below $E_d$ in the embodiment of FIG. 3. Therefore, at the end of interval 1, as the gate drive to Q1 is increased from approximately $E_i$ to $E_d$, Q1 turns off. Q1 turns on again as the voltage at node a approaches $E_d$ at the end of interval 9. This period is indicated in dashed lines in FIG. 4(b) since the actual point at which Q1 turns on is a function of the time at which node a reaches a voltage, relative to ground, which exceeds $E_i$ by at least a diode drop, thus activating voltage sensor 14. Note that, simply applying drive voltage to the gate will not cause the device to conduct since current may be flowing in the parasitic devices at the time the gate drive is actuated. For example, Q1 is turned on in FIG. 4(a) during interval 7 but, PC1 carries the current in S1 during interval 7 and PD1 carries the current through S1 during interval 8.

In FIG. 4(c) the drive voltage to the gate of Q4 is illustrated. As previously mentioned, the gate driver circuit for Q4 would be substantially identical to gate driver 12 of FIG. 3, including voltage sensor 16. As the voltage at node b dropped to approximately one diode drop below $E_c$, a voltage sensor, similar to voltage sensor 16, turns on Q4. Since the voltage at point b reaches the required potential some time during interval 9, Q4 turns on during that interval. As will be readily apparent, a substantially identical analysis will apply to the operation of switching devices Q3 and Q2.

The Full-Bridge Lossless Switching Converter of the present invention has several advantages for high frequency, high density power conversion. The energy stored in FET output capacitances is not dissipated, but rather is returned to the dc source resulting in low switching losses. The switching devices may be FETs having relatively low voltage and current ratings making them more amenable to integration. The converter of the present invention operates in the 1 to 10 MHz range at efficiencies of approximately 85% or more. Voltage control is achieved by simply phase shifting the converter half-bridge legs relative to one another, thus enabling the converter to operate at a single frequency from full to no load. Finally, a minimum number of passive components is used, enhancing the degree of size reduction attainable through integration of the converter.

While preferred embodiments of the present invention have been shown and described herein, it will be obvious to those skilled in the art that such embodiments are provided by way of example only. Numerous variations, changes, and substitutions will now occur to those skilled in the art without departing from the invention. Accordingly, it is intended that the invention be limited only by the spirit and scope of the appended claims.

What is claimed is:

1. A control circuit adapted to drive one switching device of an edge resonant converter bridge circuit comprising:
 a first switch means directly coupled to said switching device and comprising a series of transistors for turning on said switching device;
 a second switch means directly coupled to said switching device and comprising a series of transistors for turning off said switching device;
 said first switch means including means for disabling operation of said second switch means;
 said second switch means including means for disabling operation of said first switch means; and
 a voltage sensing means directly coupled to said switching device and comprising a unidirectional current device connected in series relationship with a small switching device for sensing the voltage across said switching device and for turning on said switching device at a time which ensures substantially lossless switching.

2. The control circuit of claim 1 wherein said voltage sensing means is adapted to turn said switching device on when the voltage across said switching device is approximately zero.

3. A control circuit adapted to drive a switching device of an edge resonant voltage converter bridge circuit wherein said control circuit comprises:
 a first circuit means directly coupled to said switching device and comprising a series of transistors arranged to turn on said switching device;
 a second circuit means directly coupled to said switching device and comprising a series of transistors arranged to turn off said switching device; and
 a voltage sensing means directly coupled to said switching device and comprising a unidirectional current device connected in series relationship with a small switching device for turning on said switching device when the voltage across said switching devices reaches a predetermined minimum level.

4. The control circuit of claim 3 wherein said switching device constitues a field effect transistor.

5. The control circuit of claim 3 wherein said voltage sensing means further comprises:
 an input connected to one side of said switching device, said unidirectional current device being connected to said input;
 an output connected to said first circuit means;
 said small switching device being connected between said output and a predetermined reference voltage; and
 an input to said small switching device connected to said unidirectional current device and to said predetermined reference voltage through the parallel combination of a resistor and a second unidirectional current device.

6. The voltage sensing means of claim 5 wherein said small switching device is a field effect transistor.

7. The voltage sensing means of claim 6 wherein said unidirectional current device is a diode.

8. The control circuit of claim 3 wherein said control circuit further comprises:
 a second switching device connected to said switching device to form one leg of a voltage converter bridge;
 a third circuit means directly coupled to said switching device and comprising a series of transistors arranged to turn on said second switching device;
 a fourth circuit means directly coupled to said second switching device and comprising a series of transistors arranged to turn off said second switchig device;
 a second voltage sensing means connected to said second switching device and comprising a third unidirectional switching device connected in series relationship with a second small switching device for turning on said second switching device when the voltage across said second switching device reaches a predetermined minimum level; and
 inputs to said voltage sensing means and said second voltage sensing means being connected to the junction between said switching device and said second switching device.

* * * * *